United States Patent [19]

Meubus et al.

[11] Patent Number: 5,793,858
[45] Date of Patent: Aug. 11, 1998

[54] METHOD FOR IMPROVING CALL COMPLETION RATES IN TELEPHONY

[75] Inventors: Charles Meubus, Westmount; Maude Salembier, Beaconsfield; Stephane Proulx, Montreal; Chris Weaver, Edmonton, all of Canada

[73] Assignee: Northen Telecom Limited, Montreal, Canada

[21] Appl. No.: 618,747

[22] Filed: Mar. 20, 1996

[51] Int. Cl.[6] .............................. H04M 3/42; H04M 1/64; H04M 3/00; H04M 7/00
[52] U.S. Cl. .......................... 379/210; 379/88; 379/197; 379/198; 379/233; 379/257; 379/277
[58] Field of Search ................... 379/67, 88, 89, 379/210, 211, 212, 214, 94, 230, 233, 277, 219, 220, 221, 257, 93.14, 188, 196, 197, 198

[56] References Cited

U.S. PATENT DOCUMENTS

| | | | |
|---|---|---|---|
| 4,791,665 | 12/1988 | Bogart et al. | 379/221 X |
| 4,926,462 | 5/1990 | Ladd et al. | 379/212 X |
| 4,932,042 | 6/1990 | Baral et al. | 379/94 X |
| 5,321,740 | 6/1994 | Gregorek et al. | 379/88 X |
| 5,402,472 | 3/1995 | Melampy et al. | 379/214 X |
| 5,535,269 | 7/1996 | Hamada | 379/212 X |
| 5,546,442 | 8/1996 | Foladare et al. | 379/210 X |

*Primary Examiner*—Harry S. Hong

[57] ABSTRACT

The method of in-session activation of the present invention gives Telcos the ability to offer callers a menu of call completion services when the call encounters a busy or no-answer condition. It provides in-session activation capability from DTMF and dial-pulse sets enabling callers to activate the services without having to hang up. The method is intended for residential and business end-users with RES, business lines, or PBX lines.

8 Claims, 3 Drawing Sheets

METHOD FOR IMPROVING CALL COMPLETION RATES IN TELEPHONY

BACKGROUND OF THE INVENTION

1. Field of the Invention

The present invention relates to telephone systems in general, and to methods of improving the completion rate of call attempts within such systems. More particularly still, it relates to locally selectively implementable methods for in-session activation (ISA) of call completion services to subscribers. That is, the methods of the present invention may be implemented in an originating end switching office, which meet certain minimum criteria, without affecting the rest of the telephone system of one or more operating companies (hereafter "Telco" or "Telcos"). The present invention is best implemented by utilizing existing processing capacity in the CPU of a given local (end) switching office. The minimum requirements for implementation are the so called intelligent network (IN) (i.e. end-to-end ISUP (ISDN User Part) connectivity) and subscriber lines supporting residential enhanced services (RES) PBX lines, Centrex users and small businesses. However, an IN is not required if the calls are local to the end-office.

In order to increase the completion rate of unsuccessful calls, telephone operating companies are beginning to provide a variety of pay-per-use "call completion" services. Examples of such services include Automatic Call Back/ Automatic Recall (ACB/AR), Message Delivery Service (MDS), and Universal Voice Messaging (UVM). Telcos now require a point-of-purchase promotional vehicle to increase customer awareness of those services and facilitate their use.

Other services offered by Telcos are the availability of the last calling number and similar services, which are normally invoked by the subscriber dialling "*" followed by two digits. One disadvantage of this manner of offering such services is that the subscriber is expected to memorize such codes, which is becoming unrealistic as the variety of such services grows.

2. Related Art

U.S. Pat. No. 4,932,042 granted Jun. 5, 1990 to Baral et al and entitled Spontaneous Voice and Data Messaging, provides an invention which relates to arrangements for providing a new spontaneous voice message service to any telephone customer at any telephone station when that customer encounters any destination this is busy or that does not answer. When a customer having a dual tone multifrequency (DTMF) station calls any destination that is busy or does not answer, the customer is invited, via an announcement identifying the new service, to record the caller's voice message. The announcement accompanies the returned busy tone or audible ring signal. The customer keys *867 (=*VMS) and is then connected to a Voice Message Operations Center (VMOC) which prompts the customer to record the message. Advantageously, customers need not redial a VMOC number, their own number, and a destination number to reach a VMOC for storing the video message, the added convenience of this arrangement should stimulate substantial additional use of voice message service. The announcement, at very low cost, makes the customers aware of the service at the time they are most likely to use the service.

U.S. Pat. No. 5,321,740 granted Jun. 14, 1994 to Gregorek et al. and entitled Telephone Marketing System, provides a marketing system which selectively modifies an existing telephone network by modifying a portion of the call processing software of the existing telephone network and by replacing at least a portion of an audible call progress signal generated by the telephone network by a prerecorded announcement. A calling party places a telephone call at a first telephone to a second telephone having a particular calling status. Once the call is made, a switch or an associated network signalling system determines the busy/idle status of the second telephone. In place of the usual ringback or busy signal, an announcement indicates to the calling party the status of the second telephone and a series of announcements are played for a predetermined period of time. During the announcements, the system continues to determine the status of the telephone line of the second telephone. The announcements are played until the call is completed or abandoned.

SUMMARY OF THE INVENTION

The present invention endeavours both to improve the completion rate of attempted calls, and provide a more realistic manner for subscribers to use the growing variety of enhanced services. Thus the aim of the present method is to simplify the user interface, such that users do not have to remember when and how to invoke a particular feature. The method provides a mechanism by means of which, in certain situations, the availability of services and their activation is facilitated.

The method of in-session activation of the present invention gives Telcos the ability to offer callers a menu of call completion services when the call encounters a busy or no-answer condition. It provides in-session activation capability from DTMF and dial-pulse sets enabling callers to activate the services without having to hang up. The method is intended for residential and business end-users with RES, business lines, or PBX lines.

In the preferred embodiment, upon no-answer and busy conditions, an announcement informs the caller that one or more call completion services are available. The call completion services can be accessed by using one or more levels of menu through which the end-user navigates by entering digits. If more than one level of menu is used, experienced users (i.e. power users) can always enter the appropriate sequence of digits and activate the desired service right away without having to listen to the announcements.

Thus, according to the present invention an improved method of operating a local telephone switching office having a central processor, a plurality of subscriber lines terminating at the switching office, and means for providing announcements on the subscriber lines, comprising: detecting status of a call (DN) originated by one of the subscriber lines; commencing an announcement on said one of the subscriber lines only if said call has not been completed after a predetermined time; and causing said central processor to respond to a signal originated by said one of the subscriber lines during said announcement in a manner consequent, in a predetermined manner, upon the status of said call during said announcement.

An advantage of the present method is that the nature of the call completion services which are offered and the highly flexible structure of the ISA menu which gives access to them are selectable by the Telco on a customer group and on a line basis.

Another advantage is that the implementation of ISA can be turned on or off independently for local or toll calls, and for busy and ring/no-answer (RNA) network conditions. This can be done on a line, customer group basis or office-wide basis. Also, implementation can be suppressed on a per-call call and on a per-line basis. Thus, the present method acts as a front-end to other features and affects only the way they are activated (in-session versus post-session activation).

Usually, call completion services offered by means of ISA are offered by the Telco. However, the preferred implementation accommodates competitive alternate service providers. At least one Alternate Service Provider (ASP) data may be included through by means of Telco service orders on a line-by-line basis.

At the service activation level, the ASP can be offered the same flexibility as the Telco for building their menus and selecting the various call completion services that are offered, namely:

Generic offer of services and generic menu of services
Generic offer of services and branded menu of services
Branded offer of service and generic menu of services
Generic offer of service and service invocation
Branded offer of service and service invocation
A mix of branded and generic menu items.

Furthermore, in all cases the ASP as full control over the range of services that are offered, over the choice of the announcements, and over the choice of the keys used by the subscriber to interact with ISA.

This is done by assigning the ASP option to the line. The ASP option points to an entry in a table containing service provider information, which specifies the menu structure to be used by the ASP, along with some routing information. The menu structure specified in the table follows the same format as the ISA option.

All calls routed to the ASP are provided with the following information:

Calling DN
Originally called DN
Redirection information

While the preferred embodiment of the present invention is directed to in-session activation in the event of RNA or BUSY conditions, it is equally applicable to other situations. For example, the subscriber may initiate a network prompting announcement simply by going off-hook and waiting for a predetermined period or by pressing "*", without having to memorize the codes for various service features. Of course, whatever feature a subscriber elects to invoke must be available to the particular subscriber line. But neither functionality nor limitations of an activated feature are affected by the present method.

BRIEF DESCRIPTION OF THE DRAWINGS

The preferred embodiment of the present invention will now be described in detail in conjunction with the drawings, in which.

DETAILED DESCRIPTION OF THE PREFERRED EMBODIMENT

Figure 1:
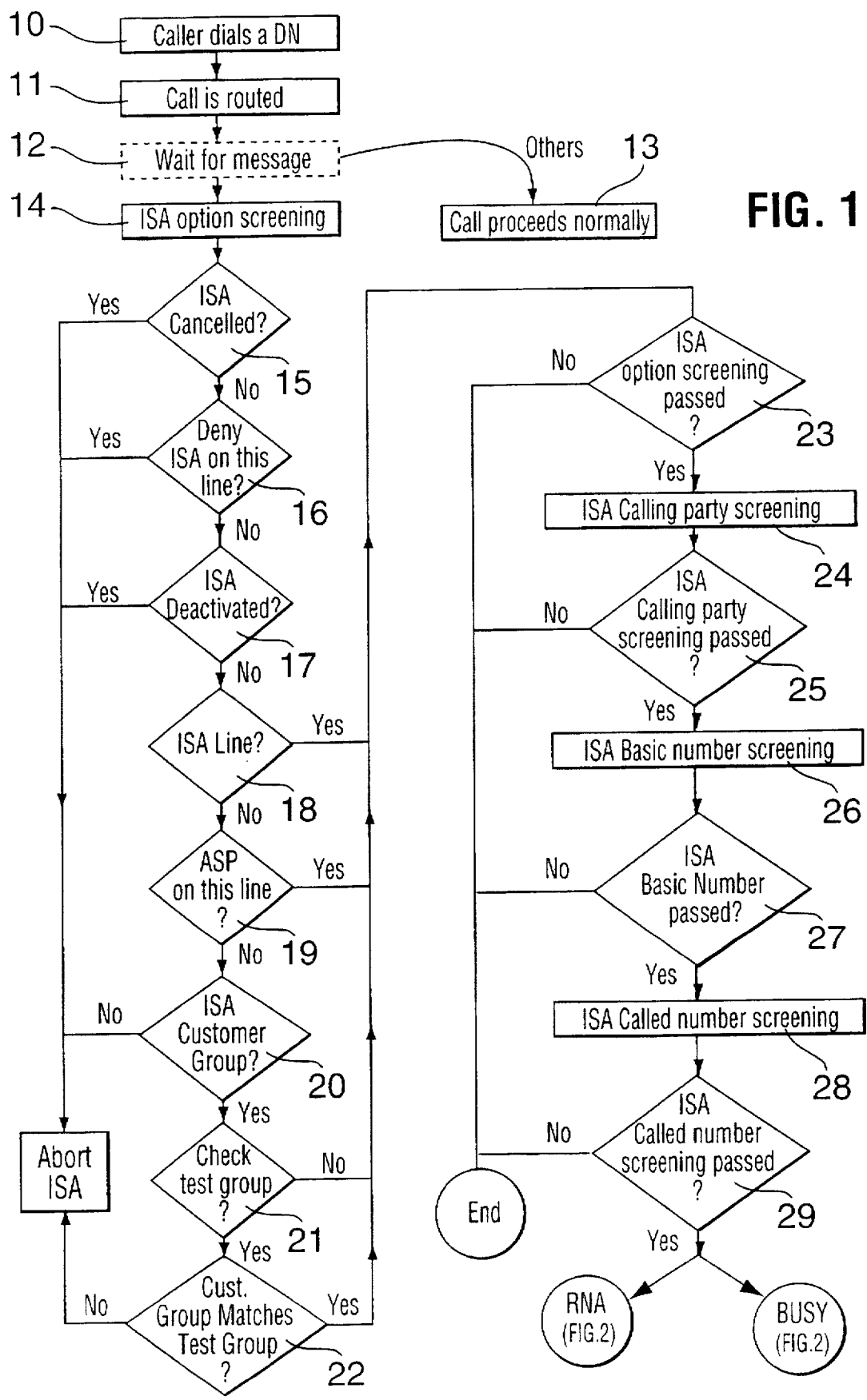
FIG. 1 is a high level flow-chart of the preliminary screening performed by a CPU in an end-office before implementing the method of the present invention for a ring-no-answer (RNA) or BUSY conditions of a dialled number (DN)

Referring to FIG. 1 of the drawings, it illustrates the "screening" that would be normally preferred by a Telco prior to implementing the method of the present invention proper. Upon a caller dialling a called DN 10, and after the call is routed 11, the system waits for a message 12 that the DN is either BUSY or that there is RNA yet. For any other return message in respect of the status of the DN (for example, the DN gone off-hook), the call proceeds normally 13 (meaning ISA is not invoked). Once a RNA or BUSY has been detected by the CPU, the existence of the ISA option screening 14 commences.

It is first examined if ISA has been cancelled 15, then if ISA should be denied this line 16 for other reasons, and whether it has been temporarily deactivated 17. If it has not, then the line is examined to see if it is one of the lines for which ISA is an option 18, and if not the line is examined to see if it belongs to an alternative service provider (ASP) 19 and, if not, whether it belongs to an ISA customer group 20 for which ISA is an option as a group. A check is then performed against a "test group" 21 and if a match is found to exist between the customer group and the test group 22, then the ISA option screening 23 has been passed.

This first level of screening may also examine: the eligibility of the detected network condition in relation to the ISA option; as well as the local/toll status of the call in relation to the specific ISA option of the subscriber's line. The screening then proceeds as follows:

Calling party screening 24,25: This consists in checking if a "deny ISA" (DENYISA) option is assigned to the line or if ISA has been deactivated for the current call with the invocation by the subscriber of a "cancel ISA" (CISA) feature.

on the following telephone numbers (N being any digit):

- N11
  - ■ 411, 611, 911, ...
  N00
  - ■ 1 + N00 (700,800,822,833,844,855,866,877,888,900)
- Directory/Operator Assistance
  - ■ 0+, 0-, 00-, 1 + NPA-555-1212, 555-1212, 1 + NPA-555-1313, 555-1313
  - ■ 10XXX#, 10XXX0+, 10XXX0-, 101XXXX#, 101XXXX0+, 101XXXX0-
- International
  - ■ 011 + CC + Address, 01 + CC + Address
- Casual dialling (10-XXXX, 101-XXX)
- Feature Group A and Feature Group B Equal Access calls
  - ■ 950 WXXX (W being either 3 or 4 in Canada)

Called number screening 28,29: The Telco can specify range of dialled digits which shall not activate ISA. Screening is done on the numbering plan area (NPA) NXX-XXXX ten-digit format and cannot be used to screen out any prefix digits.

Figure 2:
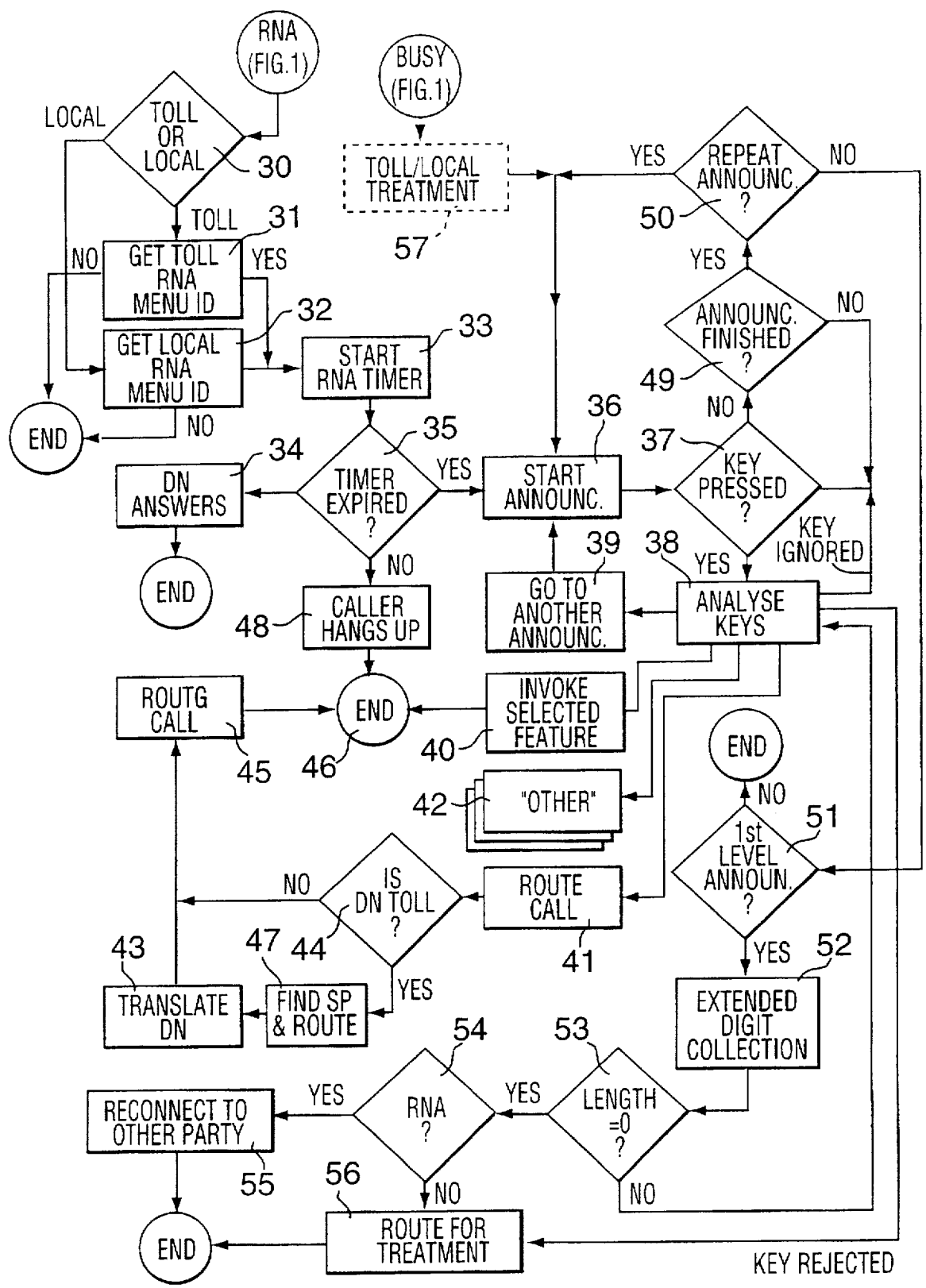
FIG. 2 is a flow-chart of the preferred method of the present invention for the RNA or BUSY status of a DN.

If the answer is NO to any screening step, then the in-session activation method is ended and the call is treated by the office as it would normally be treated. If the answer at the end of screening is YES, then the steps of the method as shown in FIG. 2 are commenced.

For the ringing-no-answer (RNA) line status, the call if first examined to see if it is a toll or local call 30, and if toll the proper announcement identified by a "menu identification" (MENUID) in a data table (hereto later) is retrieved 31, and similarly for a local call 32. If the appropriate MENUID is for any reason not found, then the procedure ends.

Otherwise, an RNA timer is started 33, which timing is specified in seconds by the Telco, and is preferably between 12 to 72 seconds.

If the called party (DN) answers 34 before the timer expires 35, ISA is aborted and the connection is established as usual between the two parties. Otherwise, ISA offer of service (i.e. an ISA announcement) is started 36.

The ISA offer of service can be made up of one or more levels of menu and gives access to one or more call completion (or other) services. The busy and RNA offers of service are chosen independently and may differ.

The Telco may select the first level announcements (for both network conditions) by datafilling their "menu identifier". A menu identifier is a pointer in an ISA menu (ISAMENU) table, where general information about the announcement is kept against the end-user's line or customer group. Once the offer of service is started, the user can enter digits, which are detected 37 and analyzed 38.

The Telco selects the default behaviour when an invalid key is entered, either ignore the key or repeat the announcement. The Telco can provide escape keys to the end-users (e.g. '#') which allows interruption of ISA and restoration of the original connection, either to the ringing party or to the busy tone.

The Telco can extend the digit acceptance period beyond the end of the first-level announcement. The length of this extended period is selected on an office-wide basis.

If the end-user enters a digit during the digit acceptance period, this digit is validated against the possible entries, as explained below.

In the RNA scenario, as soon as the caller enters a valid digit during the first level announcement, the called party is disconnected. The called party can answer the call at any point before that, which aborts ISA and the call is connected as usual.

The digits which are entered during the first level announcement are mapped using the ISAMENU table, which consists of two fields and several subfields containing data entries.

Figure 3:
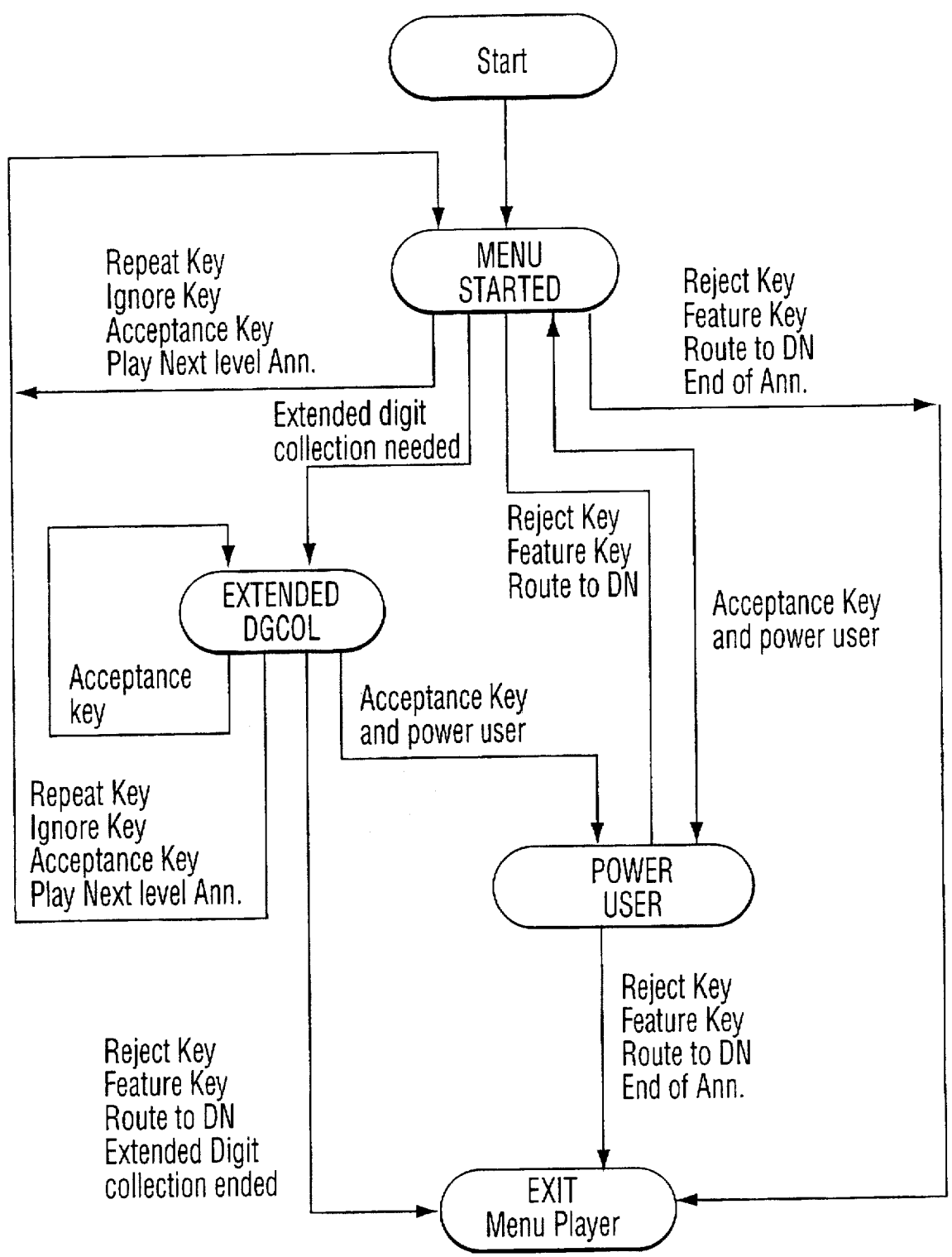
FIG. 3 is a flow-chart of the state machine for the announcement/menu player components shown in FIG. 2.

The first field contains two subfields: the menu identifier MENUID of the announcement that is currently being played to the subscriber on the line; and the digit or digits (including the "*" and "#") DIGIT that is entered by the subscriber. The entry in the first subfield may be alphanumeric and comprise several characters. The entry in the second subfield is the keypad entry by the user. The interaction between the menu and the user (i.e. digit collection) is mediated by the state machine shown in FIG. 3, in which transition between the four states of the machine occurs in accordance with the labels of the interconnecting lines. The state machine governs the transitions once the announcement (i.e. menu) is started 36 until either the end of announcement, or prior to that, a reject key has been detected, a feature has been invoked 40, routing to DN 41 has commenced, or extended digit collection 52 has ended.

The second field in the ISAMENU table contains the various possible results of ISA interaction with the subscriber. Examples of the subfields and associated entries (with a brief explanation) are as follows:

| SUBFIELD | ENTRY | EXPLANATION |
| --- | --- | --- |
| PROMPT | MENU IDENTIFIER | Provide the user with another level of menu. In this case, the DATA field will hold the MENUID of the announcement that should be played. |
| FEATURE | FEATURE ACCESS CODE (up to 17 digits) | This string of digits correspond to a tree of digits index that is used to index a feature access code (FAC) in a table. |

-continued

| SUBFIELD | ENTRY | EXPLANATION |
| --- | --- | --- |
|  | INFORMATION (up to 32 characters) | This string is used to identify what feature is being indexed by the FAC field. |
| ROUTDN | DN\|(NPA)NXX-XXXX\| | The ROUTDN (Routing DN) selector indicates that the call should be routed to the specified DN. Any network access charges are billed against the calling DN. Ten digit DN to which the call is to be routed. |
| REPEAT |  | Specifies that the announcement should be replayed. |
| REJECT |  | Specifies that ISA should be stopped and the call routed to the ISAEXIT treatment. |
| IGNORE |  | Specifies that the user entry should be ignored. |

Accordingly, a valid digit identified during the "analyze keys" 38 step may yield anyone of the above (or other) results, such as to go to another announcement 36, to invoke a selected feature 40, to route a call 41, or to anyone of "other" results or actions 42. The route call 41 invocation causes the dialled DN to be translated 43 by retrieving the up to ten digits of a new DN. If the DN is not a toll under 44, the call is routed 45 and ISA is exited 46. If the retrieved DN is a toll number 43, the service provider (SP) for the calling subscriber is found 47 and the call is routed 45, after translation of the DN 43, and ISA is exited 46, which also occurs anytime when the calls hangs up 48 before the timer has expired 35. Throughout the announcement 49 and as long as a key has not been pressed 37 the system continues in a loop until the announcement is finished and the system decides whether to repeat the announcement 50 (the criteria are at the discretion of the Telco, e.g. every announcement would be repeated once). If the decision is not to repeat the announcement and it was not the first level announcement 51, then ISA ends. If on the other hand this was the first level announcement then extended digit collection 52 is commenced for the extended digit collection period. When the first level announcement ends, the extended digit collection length is checked, and if larger than zero, digit collection is started for the given length (duration). Otherwise, the caller is reconnected to the original connection, i.e. BUSY or RNA in the present embodiment.

Referring to the top of FIG. 2, if the status of the call had been BUSY rather than RNA, the call would be subjected to the same TOLL/LOCAL TREATMENT 57, as with RNA, but an announcement would be started immediately 36 rather than after expiry of a time 35.

What is claimed is:

1. A method of operating a public, Telco operated local telephone switching office having a central processor, a plurality of subscriber lines terminating at the switching office, and means for providing announcements on the subscriber lines, comprising:

(a) detecting status of a call including the dialed number (DN) originated by one of the subscriber lines;

(b) commencing an announcement on said one of the subscriber lines only if said call has not been completed after a predetermined time while the originated call is in-session; and (c) causing said central processor to respond to a signal originated by said one of the subscriber lines during said announcement in a manner consequent, in a predetermined manner, upon the status of said call during said announcement while maintaining the originated call in-session until disposition by said central processor of the originated call in order to establish connection to said DN should it answer the call prior to said disposition.

2. The method as defined in claim 1, further comprising the step of screening said one of the subscriber lines to determine any special status assigned thereto.

3. The method as defined in claim 2, wherein said special status includes at least one of: belonging to a pre-identified subscriber group; belonging to an alternate service provider; originating a dialed number (DN) for which steps (b) and (c) are not possible.

4. The method as defined in claim 1, further comprising the step of causing another announcement in response to said signal originated by said one of the subscriber lines.

5. A method of operating a public, Telco operated local telephone switching office having a central processor, a plurality of subscriber lines terminating at the switching office, and means for providing announcements on the subscriber lines, comprising:

(a) detecting status of a call including the dialed number (DN) originated by one of the subscriber lines;

(b) commencing an announcement on said one of the subscriber lines only if said call has not been completed after a predetermined time while the originated call is in-session;

(c) causing said central processor to respond to a signal originated by said one of the subscriber lines during said announcement in a manner consequent, in a predetermined manner, upon the status of said call during said announcement while maintaining the originated call in-session until disposition by said central processor of the originated call; and (d) responding to said signal originated by said one of the subscriber lines by examining said DN and identifying a service provider if said DN is a toll number.

6. The method as defined in claim 5, further comprising the step of screening said one of the subscriber lines to determine any special status assigned thereto.

7. The method as defined in claim 5, wherein said special status includes at least one of: belonging to a pre-identified subscriber group; belonging to an alternate service provider; originating a dialed number (DN) for which steps (b) and (c) are not possible.

8. The method as defined in claim 5, further comprising the step of causing another announcement in response to said signal originated by said one of the subscriber lines.

* * * * *